USO10897048B2

(12) United States Patent
Sousa et al.

(10) Patent No.: US 10,897,048 B2
(45) Date of Patent: Jan. 19, 2021

(54) METHOD OF COATING A MEMBRANE WITH A CATALYST (71) Applicant: UNIVERSITY OF CAPE TOWN, Cape Town (ZA)

(72) Inventors: Duarte Rui Sousa, Surrey (CA); Nabeel Hussain, Rosebank (CA)

(73) Assignee: University of Cape Town, Cape Town (ZA)

( * ) Notice: Subject to any disclaimer, the term of this patent is extended or adjusted under 35 U.S.C. 154(b) by 109 days.

(21) Appl. No.: 16/343,356

(22) PCT Filed: Oct. 18, 2017

(86) PCT No.: PCT/IB2017/056467
§ 371 (c)(1),
(2) Date: Apr. 18, 2019

(87) PCT Pub. No.: WO2018/073756
PCT Pub. Date: Apr. 26, 2018

(65) Prior Publication Data
US 2019/0245215 A1 Aug. 8, 2019

(30) Foreign Application Priority Data
Oct. 19, 2016 (GB) .................................. 1617709.9

(51) Int. Cl.
*H01M 8/1004* (2016.01)
*H01M 8/1018* (2016.01)
(Continued)

(52) U.S. Cl.
CPC ............ *H01M 4/8828* (2013.01); *B05D 1/02* (2013.01); *B05D 7/04* (2013.01); *H01M 4/881* (2013.01);
(Continued)

(58) Field of Classification Search
CPC .... H01M 4/88; H01M 8/1004; H01M 8/1018; B05D 1/02; B05D 7/04
See application file for complete search history.

(56) References Cited

U.S. PATENT DOCUMENTS

2008/0206616 A1 8/2008 Atanassova et al.
2011/0174215 A1 7/2011 Nishio et al.

FOREIGN PATENT DOCUMENTS

EP 3050703 A1 8/2008
EP 2420325 A2 2/2012
(Continued)

OTHER PUBLICATIONS

European Patent Office—International Search Report of the International Searching Authority for International Application No. PCT/IB2017/056467 dated Feb. 7, 2018, 3 pgs.
(Continued)

*Primary Examiner* — James Lee
(74) *Attorney, Agent, or Firm* — Womble Bond Dickinson (US) LLP (57) ABSTRACT A method of coating a membrane having a first side and an opposite second side and carried with its second side adhering to a backer film is provided. The method includes coating the first side of the membrane with a catalyst ink or slurry with the second side adhering to the backer film and curing the coating on the first side. The backer film is then removed to expose the second side of the membrane which is fed onto a vacuum conveyor with the coated first side facing the conveyor. The second side of the membrane is then coated with a catalyst ink or slurry and the coating on the second side cured after which the membrane is removed from the vacuum conveyor.

13 Claims, 3 Drawing Sheets (51) Int. Cl.
    *B05D 1/02*     (2006.01)
    *B05D 7/04*     (2006.01)
    *H01M 4/88*     (2006.01)

(52) U.S. Cl.
    CPC ......... *H01M 4/886* (2013.01); *H01M 8/1004* (2013.01); *H01M 8/1018* (2013.01); *B05D 2201/02* (2013.01); *B05D 2252/02* (2013.01); *H01M 2008/1095* (2013.01)

(56) References Cited

FOREIGN PATENT DOCUMENTS

| | | | |
|---|---|---|---|
| EP | 2813363 A1 | 12/2014 | |
| JP | 2001070863 A | 3/2001 | |
| JP | 2005038758 A | 2/2005 | |
| JP | 2013191521 A | 9/2013 | |

OTHER PUBLICATIONS

European Patent Office—Written Opinion of the International Searching Authority for International Application No. PCT/IB2017/056467 dated Feb. 7, 2018, 6 pgs.

METHOD OF COATING A MEMBRANE WITH A CATALYST

CROSS-REFERENCE TO RELATED APPLICATIONS

This patent application is a U.S. National Phase application under 35 U.S.C. § 371 of International Application No. PCT/IB2017/056467, filed Oct. 18, 2017, entitled "A METHOD OF COATING A MEMBRANE WITH A CATALYST", which claims the priority to GB Application Number 1617709.9 filed Oct. 19, 2016, entitled "A METHOD OF COATING A MEMBRANE WITH A CATALYST", the entire contents of which are hereby incorporated herein by reference.

FIELD OF THE INVENTION

This invention relates to a method of coating a membrane for a fuel cell assembly with a catalyst. A system for use in the method is also provided.

BACKGROUND TO THE INVENTION

Fuel cells include a membrane electrode assembly (MEA) which has an anode and cathode gas diffusion layer (GDL), gaskets, and catalyst coated membrane (CCM) in laminated form. The CCM has a proton exchange membrane (PEM) coated on the anode and cathode side with a platinum based catalyst ink.

The membrane is typically supplied as a web or continuous length carried on a "casting" or "backer" sheet or film which provides it with dimensional stability during transport and handling. The membrane is typically cast onto the backer film by the supplier as part of the manufacturing process and is delivered as a two-layer assembly.

The membrane is also hygroscopic in nature, meaning that water, either from the atmosphere or from water based catalyst inks, is adsorbed upon contact. When adsorption takes place, the membrane swells and wrinkles and becomes dimensionally unstable. Upon subsequent drying, the wrinkling and swelling are reduced, but not eliminated, leaving a permanently deformed and dimensionally compromised membrane. A membrane in this wrinkled state is not useable.

To overcome this problem CCM manufacturing is accomplished through dry decal transfer processes. This is a step-wise process which occurs as follows. First, the anode and cathode catalyst ink or slurry is coated onto a release film such as polytetrafluoroethylene (PTFE) or polyimide (PI) and heat treated and fully cured. Second, the coated films are positioned on either side of the membrane which has its backer film removed. Third, the assembly is sent through a heated calendaring press or a heated reciprocal press. At elevated temperatures the membrane softens and with the applied pressure on the rollers the catalyst layers are adhered to the softened membrane. Fourth, the calendared assembly is allowed to cool. Fifth, the single-use release films are peeled off and discarded, leaving the catalyst layers adhered to the membrane.

This five step approach is commonly referred to as a "decal transfer" process. Although effective, the decal transfer process suffers from a number of drawbacks. These include that the intermediate release films are expensive and are scrapped after single use and that the high temperature and pressure needed to carry out the decal transfer process step expands the membrane making precise alignment of the Anode and Cathode coated active areas difficult. The process is labour, capital cost and utility intensive, and has a relatively slow throughput.

In an attempt to overcome these difficulties, processes have been proposed which purport to direct coat both sides of membranes with a catalyst layer. W.L. Gore developed a three step process in which catalyst ink or slurry is first coated onto a release film. Next, a membrane is cast on top of the catalyst layer. Finally, the second catalyst layer is coated on top of the membrane.

This method has two clear disadvantages. First, only a membrane manufacturer can accomplish this "3-step" method as casting membrane onto a moving web is not trivial. Second, the use of expensive intermediate release films is still necessary.

U.S. Pat. No. 8,802,329 discloses a method of manufacturing CCMs using 3M's nano-structured-thin-film (NSTF) technology. In this method the platinum is applied in a dry manner using a custom-built, vacuum deposition chamber. The process also requires the use of custom-manufactured "saw-toothed" intermediate release films. The vacuum chamber and release films make the process expensive and reliant on significant customisation of equipment and material.

The use of ultrasonic nozzles to spray a catalyst ink suspension or slurry onto a membrane are known in the art. The viscosity of the spray can be altered by varying the distance the droplets have to travel and by applying low heat to the membrane so that solvent in the droplets evaporates in the air before contacting the substrate. However, a drawback associated with this technique is that scrap or "overspray" is common, resulting in costly wastage of the expensive catalyst ink. Furthermore, heating of the substrate during spraying may promote deformation and wrinkling of the membrane.

There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a method of coating a membrane, the membrane having a first side and an opposite second side and carried with its second side adhering to a backer film, the method including coating the first side of the membrane with a first catalyst ink or slurry with the second side adhering to the backer film, curing the coating on the first side, removing the backer film to expose the second side of the membrane, feeding the membrane onto a vacuum conveyor with the coated first side facing the conveyor, coating the second side of the membrane with a second catalyst ink or slurry, curing the coating on the second side whilst on the vacuum conveyor, and removing the membrane from the vacuum conveyor.

Further features of the invention provide for the first side of the membrane to be spray coated with the first catalyst ink or slurry; and for the coating to be cured at a temperature between 40° C. and 200° C., preferably about 50° C.

Still further features of the invention provide for second side of the membrane to be spray coated with the second catalyst ink or slurry; for the membrane to be heated during spray coating of the second side; for the membrane to be heated via the vacuum conveyor; and for the membrane to be heated to between 50° C. and 200° C., preferably about 50° C. to 90° C.

Yet further features of the invention provide for the coat weight on the first side and the second side of the membrane to be measured using sensors; and for the coating of the first side and of the second side to be controlled as a result of the coat weight measurements to maintain the coat weight within a predetermined range using a varying catalyst ink or slurry flowrate as the control parameter.

Even further features provide for the first and second catalyst inks or slurries to be different or the same.

A system for coating a membrane having a first side and an opposite second side and carried with its second side adhering to a backer film, the system including a first coating station configured to coat the first side of the membrane with a first catalyst ink or slurry with the second side adhering to the backer film and having a heat zone for curing the coating, a web separator for separating the membrane from the backer film and which directs the membrane to a second coating station configured to coat the second side of the membrane with a second catalyst ink or slurry and which includes a vacuum conveyor arranged to receive the first side of the membrane on the conveyor during coating.

Further features of the invention provide for the vacuum conveyor to include a conveyor belt; for the conveyor belt to be heated; for the conveyor belt to have a layered structure and characterised in that one layer is provided by a material with high thermal conductivity; for the material with high thermal conductivity to be copper; for the conveyor belt to have a stainless steel layer over the copper layer; for a diffusion layer to be provided over the stainless steel layer; and for the diffusion layer to be provided by a non-woven material which is capable of distributing an active vacuum across its surface.

Still further features of the invention provide for the first coating station to include a sprayer for spray coating the first side of the membrane; for the second coating station to include a sprayer for spray coating the second side of the membrane; and for the sprayers at the first and second coating stations to be ultrasonic sprayers.

Embodiments of the invention will now be described, by way of example only, with reference to the accompanying drawings.

DETAILED DESCRIPTION WITH REFERENCE TO THE DRAWINGS

A method of coating a membrane with a catalyst is provided for a sheet- or film-like membrane having a first side and an opposite second side and which carried with its second side adhering to a backer or casting film or what is commonly referred to as a two-layer membrane assembly.

The sides of the membrane may equally be referred to as the anode side and cathode side, or vice versa depending on the catalyst and the coat weight that is applied. The method includes an initial step of coating the first side of the membrane with a first catalyst ink or slurry with the second side adhering to the backer film. Any suitable film coating method can be used to provide the coating, including spray coating, such as with an ultrasonic sprayer, slot die, gravure, knife-over-roll, comma bar, mayer rod and curtain coating. The backer film provides dimensional stability to the membrane and obviates the need for a special handling of the membrane.

The catalyst ink or slurry is a fluid with the catalyst in suspension. To enable spray coating to take place, it will typically have a fairly low viscosity.

Once the first side of the membrane has been coated, and with the backer film still in place, the coating is then cured or dried. This takes place in a heat treatment zone which heats the membrane and coating to a temperature of between 40° C. and 200° C. depending on the membrane and ink or slurry used. In many cases about 50° C. is optimal. Heating can take place using any suitable means, including infrared (IR), microwave and convection heating.

As a result of the membrane being adhered to the backer film, swelling resulting from contact with the solvents in the catalyst ink or slurry is confined to the vertical "Z" dimension, or normally to the backer film. The backer film prevents the hygroscopic membrane from expanding in the "X" and "Y" dimensions. The swelling that takes place in the "Z" dimension is typically small, due to the 10 μm to 25 μm membrane thickness and, once dried, the "Z" dimension is fully regained in a stable, wrinkle-free manner.

Once curing has been completed the membrane is dimensionally stable and a "half CCM" is obtained. That is to say a catalyst coated membrane which is only half coated, or coated on one side only.

Hereafter the backer film is removed to expose the second uncoated side of the membrane and the membrane then fed onto a vacuum conveyor with the coated first side facing or abutting the conveyor. The constraint provided by the vacuum prevents the hygroscopic membrane from moving or expanding in the "X" and "Y" dimensions. The second side is then coated with a second catalyst ink or slurry. Spray coating is preferable and most preferably an ultrasonic sprayer is used to apply the coating. The coating will typically be different to that applied to the first side as one side will be coated with an anode catalyst and the other with a cathode catalyst. However, in some embodiments, the first and second sides may be coated with the same catalyst ink or slurry albeit with different coat weights.

Where the catalyst ink or slurry is applied by spraying, the spray nozzles may be positioned close to the membrane in order to reduce overspray. Although in prior art methods, positioning the nozzles close to the substrate may reduce evaporation of solvent resulting in too high a solvent content in the ink, in the present method, by spraying the membrane with the backer still attached, membrane deformation in the X-Y orientation is reduced even when the spray has a high solvent content. This represents a notable advantage over prior art methods as the costs associated with wasted ink resulting from overspray are reduced. Furthermore, the membrane does not have to be heated during spraying to reduce the solvent content, which also reduces costs and simplifies the method.

Curing or drying of the coating can be achieved by heating the conveyor belt. Typically a source of heat can be built into the vacuum unit. However, a conveyor belt is also provided by the invention which permits heating to take place from below the conveyor assembly. The use of an external under-the-belt heat source allows any standard vacuum conveyor design to be used with any standard heating source so that no customization is required. The conveyor belt has a laminated construction with an upper diffusion layer, an intermediate stainless steel layer and a copper sublayer. The diffusion layer can be made of any suitable non-woven material which provides the requisite even distribution of vacuum pull to evenly distribute the active vacuum across the half CCM. Non-woven PTFE material or a standard non-woven carbon fibre paper or any standard gas diffusion layer can be used.

The copper sublayer on the conveyor belt aids in the heat transfer and heat retention. Heat from the heating unit is retained by the copper and transferred to the half CCM to effect curing of the coating. As the coated membrane is less than 100 µm thick it is able to be heated easily by the belt. Other suitable materials with a high thermal conductivity could be used in place of copper.

The coated membrane is heated to between 50° C. and 200° C., preferably about 50° C. to 90° C.

After curing a dimensionally stable catalyst coated membrane (CCM) is achieved. The constraint provided by the vacuum conveyor only permits expansion of the hygroscopic membrane in the "Z" dimension. The swelling that takes place in the "Z" dimension is typically small, due to the 10 µm to 25 µm membrane thickness and, once dried, the "Z" dimension is fully regained in a stable, wrinkle-free manner.

The CCM is finally removed from the vacuum conveyor and typically wound on a spool for further transport and handling.

Sensors can be used to measure the coat weight on the first side and the second side of the membrane and the measurements used to control the coating process via a varying flow rate to maintain the coast weight within a predetermined range. Non-destructive beta gauges or sensors, which can be used to determine the coat thickness, are positioned before and after each spray nozzle. Differences in measured thickness between the uncoated and coated membrane provide an indication of the coat weight. Feeding these results into a controller, such as a programmable logic controller (PLC), enables a closed-loop control of the platinum coating to be accomplished by regulating the ink flowrate to a particular sprayer or nozzle. Each sprayer or nozzle can have its own independent ink delivery system allowing fine tuning of the platinum coating across the membrane or web. Finer platinum coating monitoring and control can be obtained by increasing the number of nozzles and beta gauge pairings.

A system for coating a membrane having a first side and an opposite second side and carried with its second side adhering to a backer film may include a first coating station configured to coat the first side of the membrane with a first catalyst ink or slurry with the second side adhering to the backer film. The first station may be configured to provide a coating through the use of a suitable fluid coating apparatus, including a sprayer or bank of sprayers, a slot die, gravure, knife-over-roll, comma bar, mayer rod and curtain coating apparatus. Ultrasonic sprayers are preferably used.

The first coating station also includes a heat zone for curing the coating on the first side of the membrane. This can be provided using an infrared heater, a microwave generator, convection heater and the like.

Following the first coating station the system includes a web separator for separating the membrane from the backer film. The backer film will typically be wound onto a spool or drum for re-use or disposal. The membrane is directed by the web separator to a second coating station which is configured to coat the second side of the membrane with a second catalyst ink or slurry. The second coating station includes a vacuum conveyor which is arranged to receive the first side of the membrane on the conveyor during coating. The vacuum conveyor provides dimensional stability to the membrane during the coating process which may be performed through spray coating. The system preferably includes an ultrasonic sprayer or bank of sprayers which are arranged to coat the second side of the membrane.

In some embodiments, the first and second catalyst ink or slurry may be the same. In further embodiments, the first and second catalyst ink or slurry may contain the same catalyst in different ink or slurry compositions, or alternatively, may contain different catalysts in different ink or slurry compositions.

The vacuum conveyor may include a conveyor belt which is heated. In this way the coating can be cured or dried via the conveyor belt. The conveyor belt may have a layered structure with one layer provided by a material with high thermal conductivity, such as copper. The belt could have a stainless steel layer over the copper layer with a diffusion layer provided over the stainless steel layer. The diffusion layer could be provided by a non-woven material which is capable of distributing an active vacuum across its surface.

Figure 1:
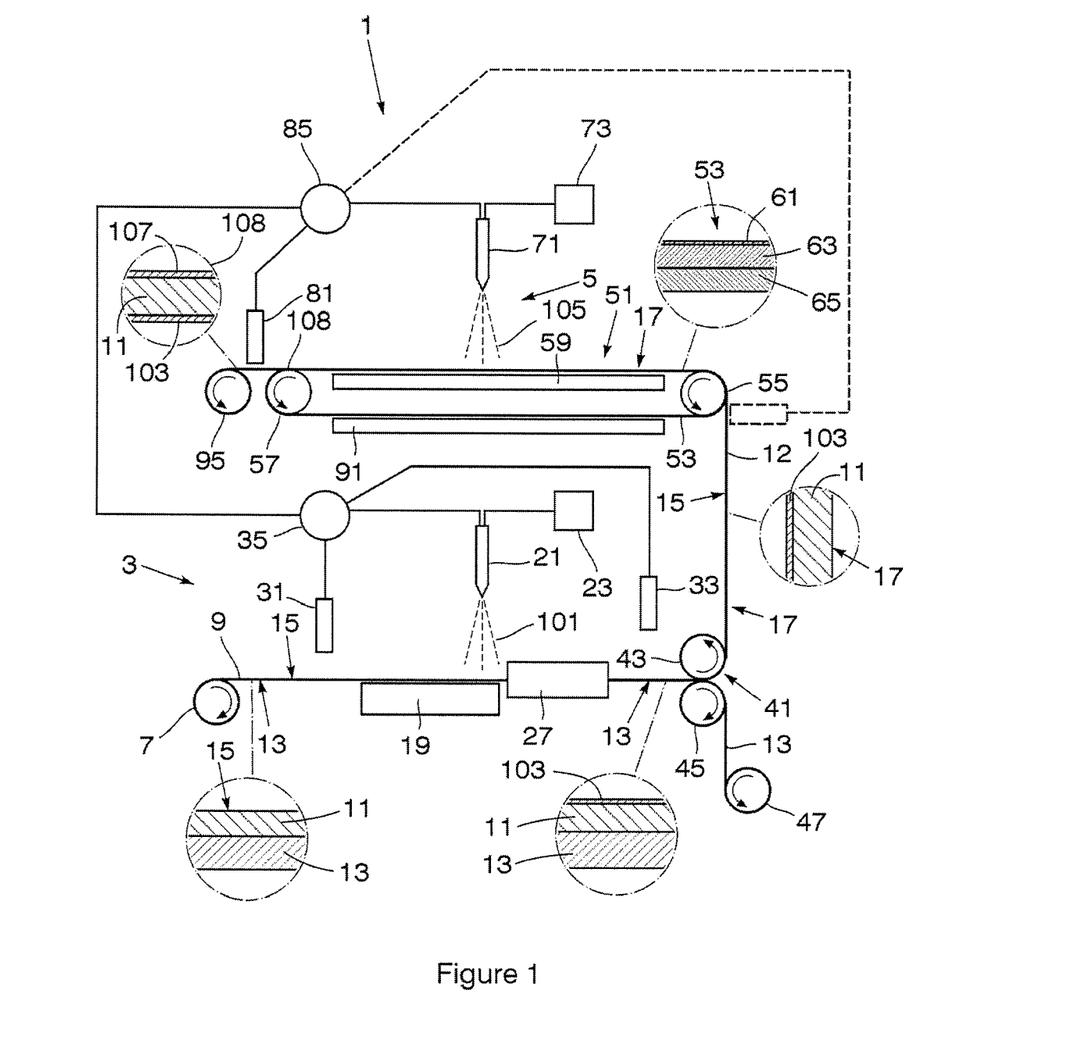
FIG. 1 is a schematic side elevation of a first embodiment of a system for coating a membrane with a catalyst.

One embodiment of a system (1) for coating a membrane, also referred to more generically as a web, with a platinum catalyst is shown in FIG. 1 and includes a first anode coating station (3) and a second cathode coating station (5). In this embodiment, the first coating station (3) provides an anode catalyst coating and will be referred to as the anode coating station, and a second coating station (5) provides a cathode catalyst coating and will be referred to as the cathode coating station. The anode and cathode catalyst coat weights are different in this embodiment and the anode and cathode coating stations apply the respective catalyst coating to either side of the membrane. A feed spool (7) or drum holds a length of a two-layer membrane assembly (9), that is a membrane (11) carried on a backer film (13). A first side (15) of the membrane is exposed with a second side (17) of the membrane adhered to the backer film (13). The two-layer membrane assembly (9) is unwound from the feed spool (7) and fed onto a table (19) or bed having a smooth surface with the first side (15) uppermost and the backer film (13) lowermost.

An ultrasonic sprayer (21) which is fed from a reservoir (23) is positioned above and directed towards the table (19). Delivery of ink to the sprayer is accomplished using a dedicated pulseless ink delivery system.

A tunnel (27) is equipped with a heater to provide a heat treatment zone for the membrane assembly (9). Sensors (31, 33), in this embodiment beta gauges or sensors, are positioned above the membrane assembly (9) before the sprayer (21) and above the coated membrane assembly after the tunnel (27) and connected to a programmable logic controller (PLC) (35) as is the sprayer (21).

A web separator (41) which includes driven rollers (43, 45) separates the coated membrane (12) from the backer film (13) after the sensor (33). A drum (47) is provided onto which the backer film (13) can be wound while the coated membrane (12) comprising the dried anode coating (103) and the membrane (11) is fed by the web separator (41) to the cathode coating station (5).

For coated membrane (12) handling convenience the cathode coating station (5) is positioned above the anode coating station (3) and arranged so that the second uncoated side (17) of the membrane (12) is uppermost when it is fed onto a vacuum conveyor (51) forming part of the cathode coating station (5). The vacuum conveyor (51) includes a conveyor belt (53) which is driven by a pair of rollers (55, 57) and runs over a vacuum table (59) which extends between the rollers (55, 57). The conveyor belt (53) is mechanically linked to the web separator (41) to ensure that there is no slippage between the coated membrane (12) and the conveyor belt (53).

In this embodiment the conveyor belt (53) has a layered construction as shown in the inset and includes an upper diffusion layer (61), an intermediate 316L stainless steel layer (63) and a copper sublayer (65). The diffusion layer (61) is made of non-woven PTFE material which provides the requisite even distribution of vacuum pull to evenly distribute the active vacuum across the coated membrane (12) supported on it. The other layers are clearly also of a vacuum permeable construction to enable a vacuum to be drawn through them.

Similarly to the anode coating station (3), an ultrasonic sprayer (71) which is fed from a reservoir (73) is positioned above and directed towards the conveyor belt (53). Delivery of ink to the sprayer (71) is accomplished using a dedicated pulseless ink delivery system.

A further sensor (81), in this embodiment also a Beta gauge, is positioned above the fully coated membrane (108) after the sprayer (71) and, together with the sprayer (71), is connected to a PLC (85). The PLC (35) is also connected to the PLC (85).

A heater (91) is provided under the vacuum conveyor (51) and positioned to heat the conveyor belt (53) as it passes over the heater (91).

The fully coated membrane (108) is wound onto a product spool (95) as it comes off the vacuum conveyor (51).

In use, the two-layered assembly (9) is fed from the feed spool (7) onto the table (19) with the first side (15) of the membrane (11) uppermost and the backer film (13) in contact with the table (19).

As it passes under the sprayer (21) the first side (15) of the membrane (11) is coated with an anode catalyst ink or slurry which is held in the reservoir (23). As the catalyst ink has to be made with a very low solids content to be effectively sprayed using the ultrasonic sprayer (21) it has a very low viscosity.

The backer film (13) provides dimensional stability to the membrane which permits both mechanical web handling and coating without swelling in the "X" and "Y" dimensions.

After coating, the two-layered assembly (9) passes through the tunnel (27) in which it is heated causing the coating to dry or cure. In this embodiment heating is carried out at about 50° C.

Hereafter the backer film (13) is removed in the web separator (41) and wound onto the drum (47). The membrane (11) which is coated with the anode catalyst (103) on its first side (15), referred to as a "half CCM" (12), moves onto the vacuum conveyor (51) of the cathode coating station (5). The uncoated second side (17) of the membrane faces upwardly on the conveyor belt (53) with the catalyst (103) coated first side (15) face down, abutting the conveyor belt (53).

Because the backer film (13) has now been removed, the membrane (11) must be constrained under vacuum as it is sprayed and heat treated. Mechanically linking the conveyor belt (53) to the web handling system ensures that there is no slippage between the catalyst coated first side (15) or anode layer and the belt (53).

As it moves under the sprayer (71) the second side (17) of the membrane (11) is coated with a cathode catalyst ink or slurry held in the reservoir (73).

Curing of the catalyst coating (107) is achieved through the heater (91) beneath the vacuum conveyor (51). Due to the copper sublayer (65), heat is effectively transferred to and retained by the conveyor belt (53). The heat is then transferred to the half CCM. As the half CCM is less than 100 μm thick it is able to be heated easily by the belt to a target temperature, in this embodiment, of about 50° C. to 90° C.

The under-mounted heater (91) has the great advantage that it enables the stand-alone use of a standard vacuum conveyor, free from the need for customisation.

After the membrane (11) has received the cathode catalyst (107) coating a full CCM (108) is obtained which is then wound onto the spool (95) for further handling.

Control of both the anode catalyst coating (103) and the cathode catalyst coating (107) is achieved using the sensors (31, 33, 81). Continuous, real-time and in-line anode coat weight measurement takes place through the positioning of Beta gauges before (31) and after (33) the anode coating and drying zone (27). The PLC (35) compares the difference in signals from gauges (31) versus gauges (33) and the thickness of the anode platinum coating is determined as a result. Coat weight can be derived from the coated thickness and platinum loading derived from the coat weight.

The output signal from the gauge (33) is sent to the PLC (85) and becomes the input signal for the cathode platinum coat weight determination. A constant can be used to account for the thickness of the removed backer film (13) as this film is precisely cast. However, for increased precision a fourth Beta gauge can be positioned after roller (43) to take a reading and this reading used as the input signal for the cathode coat weight determination. The PLC (85) compares the difference in signals between the gauge (81) and the gauge (33) and the cathode coat weight is determined as a result. A continuous platinum loading determination can be accomplished along the web, as the web travels under each gauge.

If required, to gain an understanding of the variation in coat weight across the web, multiple gauges can be used side-by-side. Also, if multiple sprayers are used, for example side-by-side across the width of the web, a dedicated Beta gauge can be positioned to monitor the performance of each sprayer or spray nozzle.

For both the anode and the cathode coating stations a closed-loop control of the platinum loading can be achieved by regulating the ink flowrate (103) and (105) for the anode and cathode spray stations respectively, to a particular sprayer or spray nozzle. Each sprayer will have its own independent ink delivery system allowing fine tuning of the platinum coating across the web. Each dedicated ink delivery system can be coupled to the feedback control loop for platinum loading, allowing individual control of each sprayer's flowrate. Finer platinum coating monitoring and control can be obtained by increasing the number of nozzles and Beta gauge or sensor pairings.

The system (1) permits a membrane to be directly coated on both sides with a catalyst to produce a dimensionally stable CCM. The advantages it offers over the prior art include the following:

a. No need to purchase expensive intermediate release films that are scrapped after use;
b. No added decal transfer labour;
c. No added decal transfer capital costs;
d. Elimination of potential for decal transfer yield losses;
e. No decal transfer utility costs;
f. Faster throughput along the manufacturing line shortening delivery lead times;

g. Direct coating delivers dimensionally stable patterned coatings on the membrane as the product is never subjected to the high temperature and pressure needed to carry out the decal transfer process step. This translates into improved product quality and improved process yields.

Cost models show a minimum 17% cost reduction by eliminating the intermediate release films and decal transfer labour alone.

Coating the membrane directly while still adhered to the backer film presents a significant advantage in that no specialised or custom equipment is required and in that any suitable coating process or method can be used. This obviates the need for a pair of vacuum conveyors and significantly reduces the capital cost of the equipment required.

Figure 2:
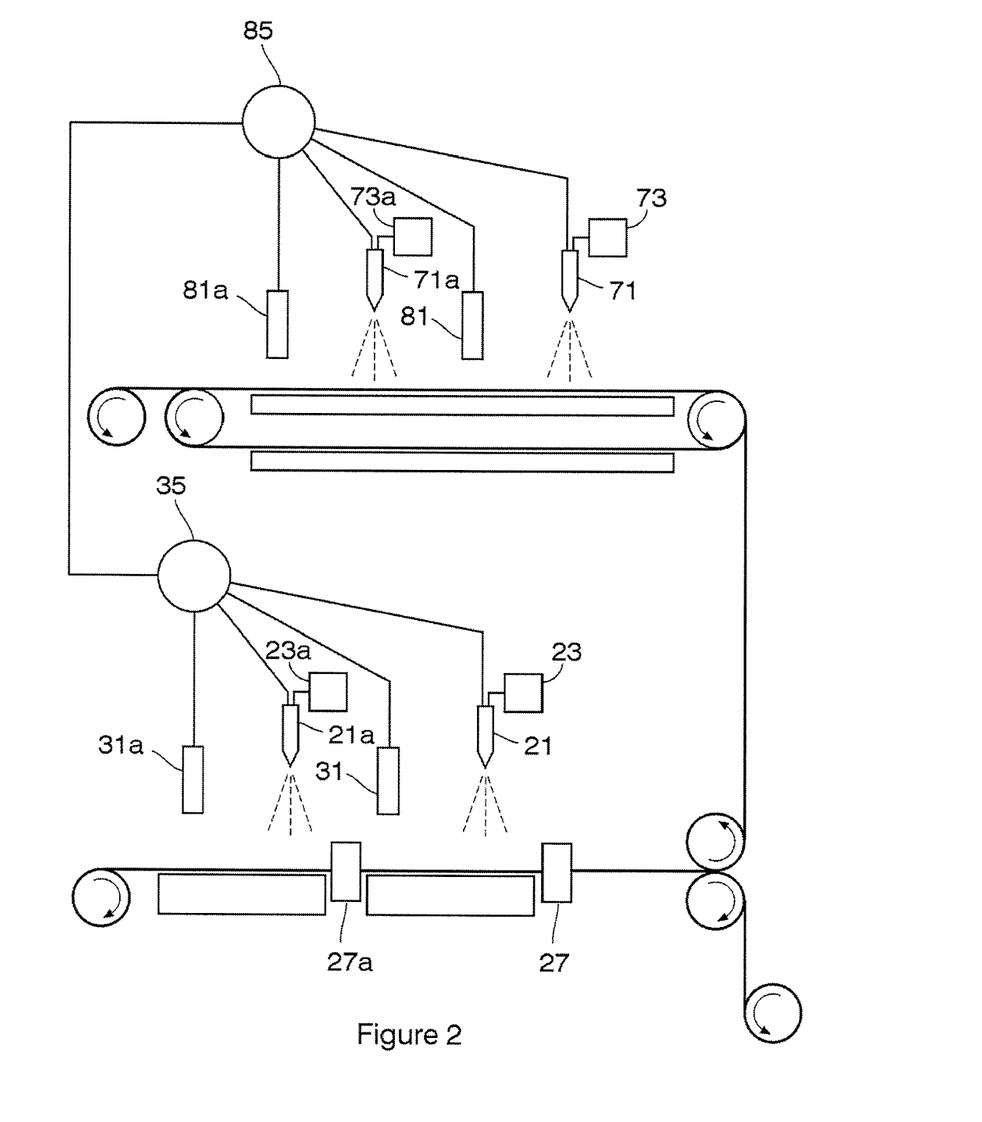
FIG. 2 is a schematic side elevation of a second embodiment of a system for coating a membrane with a catalyst.

It will be appreciated that many other embodiments of a coating system exist which fall within the scope of the invention. For example cathode and anode coating can take place in any order and make use of any suitable catalyst ink or slurry. The catalyst ink or slurry applied to the cathode and anode sides of the membrane may be the same or different. Where the catalyst ink or slurry are different, the same catalyst may be used in different solvents in each of the cathode and anode ink or slurry. Alternatively, different catalysts may be used in the same solvent in each of the cathode and anode ink or slurry. Any number of sprayers can be used and these can be arranged to sequentially apply different inks or slurries as shown in FIG. 2 (where features shared with the system in FIG. 1 have the same numbering). By providing each sprayer (21, 21a, 71, 71a) with a dedicated reservoir (23, 23a, 73, 73a), sensor (31, 31a, 81, 81a), and in the case of the anode coating station, a heating zone (27, 27a) after each sprayer (21, 21a), layers of different catalysts or having different properties can be applied on the membrane (11). Any number of sprayers or banks of sprayers can be used and this permits an almost endless number of potential layer compositions to be provided on the membrane. Importantly, it is relatively straightforward to install any desired number of sprayers or banks of sprayers and this can be done at low cost.

Figure 3:
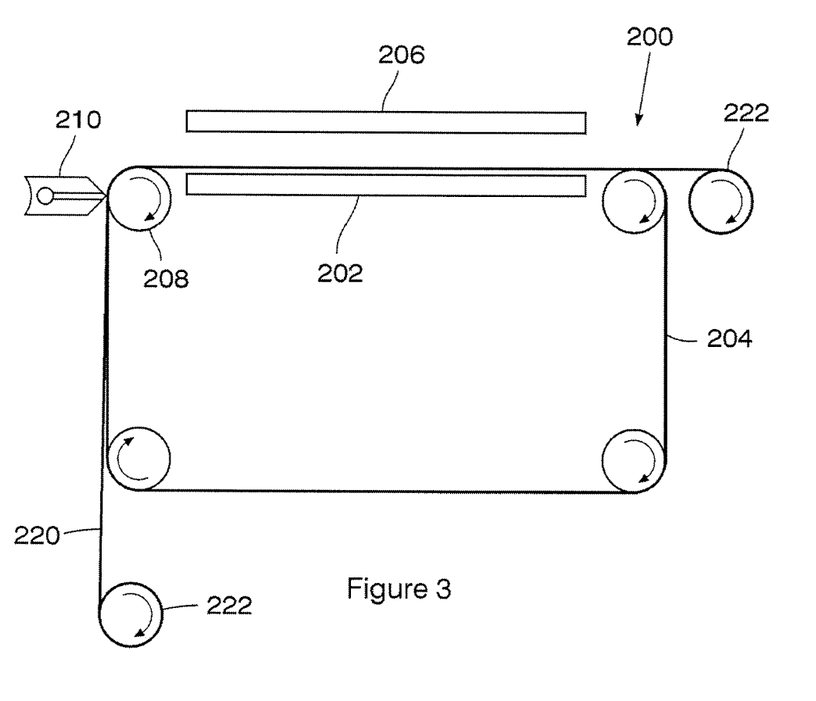
FIG. 3 is a schematic side elevation of a roll-to-roll slot die coating system.

Any suitable coating method can be used, particularly in the first coating step where the membrane is adhered to the backer film. However, it is also possible to use other coating techniques in conjunction with a vacuum conveyor. Referring to FIG. 3, a vacuum conveyor (200) can include a vacuum table (202) over which a conveyor belt (204) runs, in this embodiment provided by a continuous diffusive substrate (DS). A heater (206) over the vacuum table (202) provides a heating zone for drying or curing.

The conveyor (200) includes a vacuum roller (208) at an end before the heater (206). The vacuum roller and vacuum table are interconnected such that there is no loss of vacuum on the moving web between the coating head (210) and the end of heating zone (206). A slot die (210) is positioned adjacent the vacuum roller (208). Slot dies are well known and their operation will be apparent to those skilled in the art.

The membrane (220) is fed from a spool (222) and travels on the DS conveyor belt at the identical web speed. This is accomplished with mechanical coupling of the two web control systems. As the membrane (220) travels over a vacuum roller (208), under the pull of vacuum, it is coated with a catalyst ink by the slot die (210). The coated membrane (220), still under the pull of vacuum, then enters the drying zone which fully dries the membrane before it exits the vacuum zone provided by the vacuum table (202). The coated membrane with full dimensional stability can then be wound onto a further spool (222).

The coating system of FIG. 3 can easily be integrated into the system of FIG. 1 and used to replace the cathode coating station of that system.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method of coating a membrane, the membrane having a first side and an opposite second side and carried with its second side adhering to a backer film, the method including coating the first side of the membrane with a first catalyst ink or slurry with the second side adhering to the backer film, curing the coating on the first side, removing the backer film to expose the second side of the membrane, feeding the membrane onto a vacuum conveyor with the coated first side facing the conveyor, coating the second side of the membrane with a second catalyst ink or slurry, curing the coating on the second side, and removing the membrane from the vacuum conveyor, wherein the catalyst loading on the first side and on the second side of the membrane is measured using sensors.

2. A method of coating a membrane as claimed in claim 1 in which the first side of the membrane is spray coated with the first catalyst ink or slurry.

3. A method of coating a membrane as claimed in claim 1 in which the coating on the first side is cured at a temperature between 40° C. and 200° C.

4. A method of coating a membrane as claimed in claim 1 in which the second side of the membrane is spray coated with the second catalyst ink or slurry.

5. A method of coating a membrane as claimed in claim 1 in which the membrane is heated during spray coating of the second side.

6. A method of coating a membrane as claimed in claim 5 in which the membrane is heated through the vacuum conveyor.

7. A method of coating a membrane as claimed in claim 5 in which the membrane is heated to between 50° C. and 200° C.

8. A method of coating a membrane as claimed in claim 1 in which the coating of the first side and of the second side is controlled as a result of the catalyst loading measurements to maintain the catalyst loading within a predetermined range.

9. A system for coating a membrane having a first side and an opposite second side and carried with its second side adhering to a backer film, the system including a first coating station configured to coat the first side of the membrane with a first ink or slurry with the second side adhering to the backer film and having a heat zone for curing the coating, a web separator for separating the membrane from the backer film and which directs the membrane to a second coating station configured to coat the second side of the membrane with a second ink or slurry and which includes a vacuum conveyor arranged to receive the first side of the membrane on the conveyor during coating, and sensors configured to measure the catalyst loading on the first side and on the second side of the membrane.

10. A system as claimed in claim 9 in which the vacuum conveyor includes a heated conveyor belt.

11. A system as claimed in claim 10 in which the conveyor belt has a layered structure with one layer provided by a material with high thermal conductivity.

12. A system as claimed in claim 9 in which the first coating station includes an ultrasonic sprayer for spray coating the first side of the membrane.

13. A system as claimed in claim 9 in which the second coating station includes an ultrasonic sprayer for spray coating the second side of the membrane.

* * * * *